(12) United States Patent
Liu et al.

(10) Patent No.: US 10,819,142 B2
(45) Date of Patent: Oct. 27, 2020

(54) POWER SUPPLY CIRCUIT AND UPS AUXILIARY POWER SUPPLY SYSTEM HAVING THE SAME

(71) Applicant: Delta Electronics, Inc., Taoyuan (TW)

(72) Inventors: Zhenji Liu, Taoyuan (TW); Wen-Kang Hsu, Taoyuan (TW); Liang Xiong, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/438,492

(22) Filed: Jun. 12, 2019

(65) Prior Publication Data

US 2019/0386509 A1 Dec. 19, 2019

(30) Foreign Application Priority Data

Jun. 19, 2018 (CN) .......................... 2018 1 0648186

(51) Int. Cl.
*H02J 1/00* (2006.01)
*H02J 9/06* (2006.01)
*H02M 3/335* (2006.01)
*H02J 9/00* (2006.01)

(52) U.S. Cl.
CPC ................ *H02J 9/061* (2013.01); *H02J 9/00* (2013.01); *H02M 3/33576* (2013.01)

(58) Field of Classification Search
CPC ......... H02J 9/061; H02J 9/00; H02M 3/33576
See application file for complete search history.

(56) References Cited

U.S. PATENT DOCUMENTS

2010/0142228 A1* 6/2010 Yamauchi ......... H02M 3/33584
 363/17
2014/0001862 A1* 1/2014 Hsueh .................... H02J 9/061
 307/66

* cited by examiner

*Primary Examiner* — Dinh T Le
(74) *Attorney, Agent, or Firm* — CKC & Partners Co., LLC

(57) ABSTRACT

The present invention discloses a power supply circuit and a UPS auxiliary power supply system having the same. The power supply circuit comprises a transformer, a primary-side switch unit and a secondary-side switch unit. When the input power supply is powered on, the second switch of the secondary-side switch unit maintains in an off state, the first switch of the primary-side switch unit performs an on-off action, and the input power supply supplies power to the load and the energy storage unit. When the input power supply is powered down, the first switch of the primary-side switch unit maintains in an off state, the second switch of the secondary-side switch unit performs an on-off action, and the energy storage unit supplies power to the load.

21 Claims, 1 Drawing Sheet

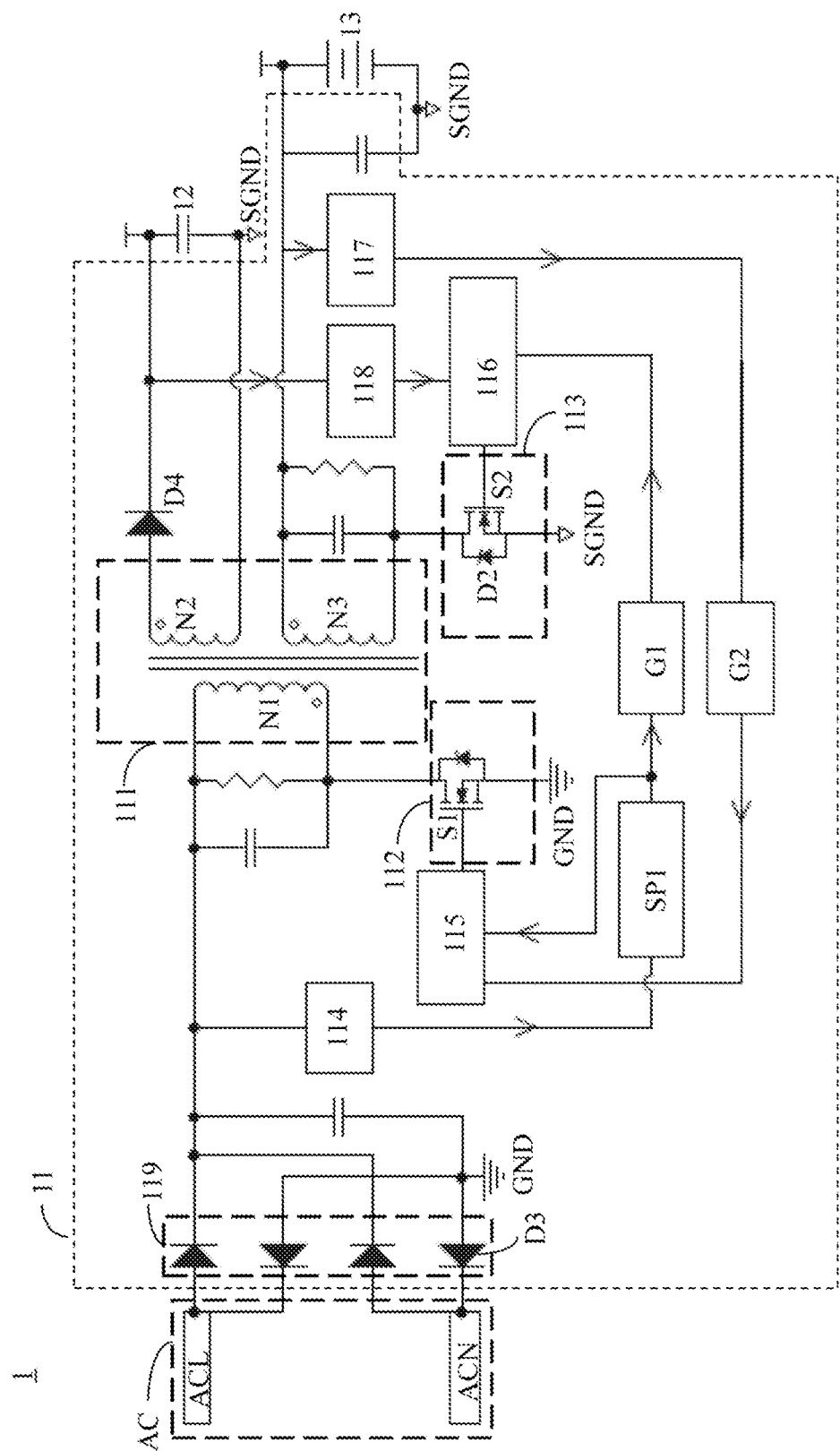

POWER SUPPLY CIRCUIT AND UPS AUXILIARY POWER SUPPLY SYSTEM HAVING THE SAME

CROSS-REFERENCE TO RELATED APPLICATIONS

This non-provisional application claims priority under 35 U.S.C. § 119(a) on Patent Application No. 201810648186.X filed in P.R. China on Jun. 19, 2018, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to a power supply circuit and a UPS auxiliary power supply system having the same, and particularly to a three-in-one power supply circuit, where a load receives power from an input power supply and an energy storage unit and the input power supply charges the energy storage unit, and a UPS auxiliary power supply system having the same.

BACKGROUND ART

In the existing UPS auxiliary power supply system, in order to realize that a load receives power from an input power supply, the load receives power from an energy storage unit, and the energy storage unit is charged by the input power supply, circuits of different designs are required to realize the foregoing functions, that is, the three functions are realized by separate circuit structures. In the actual implementation, such approach not only increases the production cost but also greatly occupies the limited space of the system, increasing the difficulty in the miniaturization of the product. Therefore, it is urgent to develop a power supply circuit that may overcome the above drawbacks and a UPS auxiliary power supply system having the same.

DISCLOSURE OF THE INVENTION

In order to overcome the above-mentioned problems existing in the prior art, an object of the present invention is to provide a power supply circuit, comprising:

a transformer having a primary winding, a first secondary winding and a second secondary winding that are magnetically coupled, the primary winding coupled to an input power supply, the first secondary winding coupled to a load, and the second secondary winding coupled to an energy storage unit;

a primary-side switch unit coupled to the primary winding and having a first switch; and a secondary-side switch unit coupled to the second secondary winding and having a second switch and a second diode connected to the second switch in anti-parallel;

wherein when the input power supply is powered on, the second switch maintains in an off state, the first switch performs an on-off action, and the input power supply supplies power to the load and the energy storage unit; when the input power supply is powered down, the first switch maintains in an off state, the second switch performs an on-off action, and the energy storage unit supplies power to the load.

The present invention further provides a UPS auxiliary power supply system, comprising:

an energy storage unit; and the power supply circuit as described above, the power supply circuit coupled to a power supply, a load and the energy storage unit.

As compared with the prior art, the power supply circuit and the UPS auxiliary power supply system having the same according to the present invention can achieve the three-in-one function that a load receives power from an input power supply and an energy storage unit and the input power supply charges the energy storage unit, thereby reducing costs, saving system space and increasing the charging efficiency.

BRIEF DESCRIPTION OF THE DRAWINGS

FIG. 1 is a schematic diagram showing the structure of a UPS auxiliary power supply system according to the present invention.

DETAILED DESCRIPTION OF EMBODIMENTS

Hereinafter, the present invention will be further described in detail with reference to the accompanying drawings and embodiments; the embodiments are carried out on the premise of the technical solution of the present invention, and the implementation and operation processes are provided. However, the protection scope of the present invention is not limited to the following embodiments.

Referring to FIG. 1, FIG. 1 is a schematic diagram showing the structure of a UPS auxiliary power supply system according to the present invention.

The UPS auxiliary power supply system 1 in this embodiment includes an input power supply AC, a power supply circuit 11, a load 12, and an energy storage unit 13. The power supply circuit 11 is coupled to the power supply AC, the load 12, and the energy storage unit 13. The power supply circuit 11 includes: a transformer 111, a primary-side switch unit 112, and a secondary-side switch unit 113. The transformer 111 includes a primary winding N1, a first secondary winding N2, and a second secondary winding N3 that are magnetically coupled. The primary winding N1 is coupled to the input power supply AC, the first secondary winding N2 is coupled to the load 12, and the second secondary winding N3 is coupled to the energy storage unit 13. The primary-side switch unit 112 is coupled to the primary winding N1 and comprises a first switch S1. The secondary-side switch unit 113 is coupled to the second secondary winding N3 and comprises a second switch S2 and a second diode D2 connected to the second switch S2 in anti-parallel. When the anode voltage of the second diode D2 is greater than the cathode voltage, the second diode D2 is naturally turned on. When the input power supply AC is powered on, the second switch S2 maintains in an off state, the first switch S1 performs an on-off action, and the input power supply AC supplies power to the load 12 and the energy storage unit 13. When the input power supply AC is powered down, the first switch S1 maintains in an off state, the second switch S2 performs an on-off action, and the energy storage unit 13 supplies power to the load 12. The energy storage unit may be an energy storage device such as a battery. Further, the power supply circuit 11 further includes: a first signal sampling unit 114, a first signal driving unit 115, and a second signal driving unit 116. The first signal sampling unit 114 is coupled to the primary winding N1 to output a first signal reflecting a state of the input power supply. The first signal driving unit 115 is coupled to the first switch S1, and controls the first switch S1 to maintain in the off state or perform the on-off action according to the first signal. The second signal driving unit 116 is coupled to the second switch S2, and controls the second switch S2 to maintain in the off state or perform the on-off action according to the first signal.

In this embodiment, the first signal sampling unit 114 may be coupled to the enable ends of the first signal driving unit 115 and the second signal driving unit 116, respectively. When the input power supply AC is powered on, the first signal driving unit 115 is enabled and the second signal driving unit 116 is disabled, according to the first signal. When the input power supply AC is powered down, the first signal driving unit 115 is disabled and the second signal driving unit 116 is enabled, according to the first signal. In other embodiments of the present invention, the first signal sampling unit 114 may be connected to a control unit for controlling the first signal driving unit 115 or the second signal driving unit 116. However, the present invention is not limited thereto, as long as the first signal driving unit 115 and the second signal driving unit 116 can control the first switch S1 and the second switch S2 according to the first signal.

It should be noted that, in this embodiment, the first signal reflects the input voltage of the primary winding N1, but the present invention is not limited thereto.

In this embodiment, a first end of the primary winding N1 is coupled to the first end ACL of the input power supply AC, a second end of the primary winding N1 is coupled to a first end of the primary-side switch unit 112, and a second end of the primary-side switch unit 112 is coupled to a second end ACN of the input power supply AC. The first switch S1 is a metal-oxide semiconductor field effect transistor, but the present invention is not limited thereto. The first switch S1 may also be a triode such as an insulation gate bipolar transistor, as long as a control end of the first switch S1 is coupled to an output end of the first signal driving unit 115. The secondary-side switch unit 113 is a metal-oxide semiconductor field effect transistor having a gate coupled to an output end of the second signal driving unit 116, a drain coupled to a second end of the second secondary winding, and a source coupled to the second end of the energy storage unit. The second diode is a body diode of the metal-oxide semiconductor field effect transistor. The first end of the energy storage unit is coupled to the first end of the second secondary winding. The second diode D2 is connected to the second switch S2 in anti-parallel, and when the second switch S2 is turned off, current can be charged to the energy storage unit 13 through the second diode D2. In other embodiments of the present invention, the second diode D2 may also be a separate device externally connected to the second switch S2, which is suitable for applications without much demanding for power density.

Moreover, the power supply circuit 11 further includes: a second signal sampling unit 117 and a third signal sampling unit 118. The second signal sampling unit 117 is coupled to the energy storage unit 13 to output a second signal reflecting a state of the energy storage unit, wherein the second signal sampling unit 117 is coupled to the first signal driving unit 115. When the first switch S1 performs the on-off action, the first signal driving unit 115 controls an on-time of the first switch S1 according to the second signal. The third signal sampling unit 118 is coupled to the load 12 to output a third signal reflecting a state of the load. The third signal sampling unit 118 is coupled to the second signal driving unit 116. When the second switch S2 performs the on-off action, the second signal driving unit 116 controls an on-time of the second switch S2 according to the third signal. When the energy storage power supply is, for example, a battery, the power supply circuit 11 can effectively control the charging voltage and charging current of the battery during equalizing charging and floating charging. It should be noted that, in this embodiment, the second signal reflects a terminal voltage of the energy storage unit 13, and the third signal reflects a terminal voltage of the load 12, but the present invention is not limited thereto.

Moreover, the power supply circuit 11 further includes: a first signal processing unit SP1 coupled between the first signal sampling unit 114 and the first and second signal driving units 115 and 116, and the first signal is output to the first and second signal driving units 115 and 116 after being processed by the first signal processing unit SP1.

Furthermore, the power supply circuit 11 further includes a first isolation unit G1 and a second isolation unit G2. The first isolation unit G1 is coupled between the first signal processing unit SP1 and the second signal driving unit 116, and the first signal is output to the second signal driving unit 116 after being sequentially processed by the first signal processing unit SP1 and the first isolation unit G1. The second isolation unit G2 is coupled between the second signal sampling unit 117 and the first signal driving unit 115, and the second signal is output to the first signal driving unit 115 after being processed by the second isolation unit G2.

In some embodiments of the present invention, the first signal processing unit SP1 may be an analog-to-digital conversion circuit, and the first signal is an analog signal reflecting an input voltage of the primary winding N1. The first signal processing unit SP1 converts the analog signal into a digital signal and outputs the digital signal to the enable end of the first signal driving unit 115, and meanwhile, the digital signal is output to the enable end of the second signal driving unit 116 through the first isolation unit G1.

It should be noted that, in this embodiment, the power supply circuit 11 further includes a rectifying unit 119 coupled between the input power supply AC and the primary winding N1. The rectifying unit 119 is a full bridge circuit having a switching element as a rectifying diode D3. When the input power supply AC is powered down, the rectifying diode D3 can prevent energy backflow.

In this embodiment, the power supply circuit 11 further includes a secondary-side diode D4. An anode of the secondary-side diode D4 is coupled to the first end of the first secondary winding N2, a cathode of the secondary-side diode D4 is coupled to the first end of the load 12, and the second end of the load 12 is coupled to the second end of the first secondary winding N2. The second end of the primary winding N1, the first end of the first secondary winding and the first end of the second secondary winding are ends of the same name.

In this embodiment, the power supply circuit 11 further includes a plurality of filter circuits connected in parallel to both ends of the input power supply AC, the second secondary winding N2 and the energy storage power supply 13, respectively, and a buffer circuit connected in parallel to both ends of the primary winding N1.

In summary, the power supply circuit and the UPS auxiliary power supply system having the same according to the present invention can achieve the three-in-one function that a load receives power from an input power supply and an energy storage unit and the input power supply charges the energy storage unit, thereby reducing costs, saving system space and increasing the charging efficiency through the substitution for the existing system.

It is to be noted that the above embodiments are only provided to illustrate the present invention without limiting the technical solution described in the present invention. Meanwhile, although the present invention is described in detail with reference to the above embodiments in this specification, the ordinary persons skilled in the art should understand that changes or equivalent substitutions can be made to the present invention. Therefore, all the technical solutions and the improvements thereof not departing from the spirit and scope of the present invention should be covered by the protection scope of the appended claims of the present invention.

The invention claimed is:

1. A power supply circuit, comprising:
   a transformer having a primary winding, a first secondary winding and a second secondary winding that are magnetically coupled, the primary winding coupled to an input power supply, the first secondary winding coupled to a load, and the second secondary winding coupled to an energy storage unit;
   a primary-side switch unit coupled to the primary winding and comprising a first switch; and
   a secondary-side switch unit coupled to the second secondary winding and comprising a second switch and a second diode connected to the second switch in anti-parallel;
   wherein, when the input power supply is powered on, the second switch maintains in an off state, the first switch performs an on-off action, and the input power supply supplies power to the load and the energy storage unit; when the input power supply is powered down, the first switch maintains in an off state, the second switch performs an on-off action, and the energy storage unit supplies power to the load.

2. The power supply circuit of claim 1, further comprising:
   a first signal sampling unit coupled to the primary winding to output a first signal reflecting a state of the input power supply;
   a first signal driving unit coupled to the first switch and controlling the first switch to maintain in the off state or perform the on-off action according to the first signal; and
   a second signal driving unit coupled to the second switch and controlling the second switch to maintain in the off state or perform the on-off action according to the first signal.

3. The power supply circuit of claim 2, wherein the first signal sampling unit is coupled to enable ends of the first signal driving unit and the second signal driving unit, respectively; and
   wherein, when the input power supply is powered on, the first signal driving unit is enabled and the second signal driving unit is disabled, according to the first signal; when the input power supply is powered down, the first signal driving unit is disabled and the second signal driving unit is enabled, according to the first signal.

4. The power supply circuit of claim 2, further comprising:
   a second signal sampling unit coupled to the energy storage unit to output a second signal reflecting a state of the energy storage unit;
   wherein the second signal sampling unit is coupled to the first signal driving unit, and when the first switch performs the on-off action, the first signal driving unit controls an on-time of the first switch according to the second signal.

5. The power supply circuit of claim 2, further comprising a third signal sampling unit coupled to the load to output a third signal reflecting a state of the load;
   wherein the third signal sampling unit is coupled to the second signal driving unit, and when the second switch performs the on-off action, the second signal driving unit controls an on-time of the second switch according to the third signal.

6. The power supply circuit of claim 3, further comprising a first signal processing unit coupled between the first signal sampling unit and the first and second signal driving units.

7. The power supply circuit of claim 6, wherein the first signal processing unit is an analog-to-digital conversion unit.

8. The power supply circuit of claim 7, wherein the analog-to-digital conversion unit converts the first signal into an enable signal, and the enable signal is output to the enable ends of the first signal driving unit and the second signal driving unit.

9. The power supply circuit of claim 6, further comprising a first isolation unit coupled between the first signal processing unit and the second signal driving unit,
   wherein the first signal is output to the second signal driving unit after being sequentially processed by the first signal processing unit and the first isolation unit.

10. The power supply circuit of claim 4, further comprising a second isolation unit coupled between the second signal sampling unit and the first signal driving unit,
    wherein the second signal is output to the first signal driving unit after being processed by the second isolation unit.

11. The power supply circuit of claim 1, further comprising a rectifying unit coupled between the input power supply and the primary winding.

12. The power supply circuit of claim 2, wherein the first signal reflects an input voltage of the primary winding.

13. The power supply circuit of claim 4, wherein the second signal reflects a terminal voltage of the energy storage unit.

14. The power supply circuit of claim 5, wherein the third signal reflects a terminal voltage of the load.

15. The power supply circuit of claim 11, wherein the rectifying unit is a full bridge circuit having a rectifying diode as a switching element of the full bridge circuit.

16. The power supply circuit of claim 2, wherein the secondary-side switch unit is a metal-oxide semiconductor field effect transistor having a gate coupled to an output end of the second signal driving unit, a drain coupled to a second end of the second secondary winding, and a source coupled to a second end of the energy storage unit,
    wherein a first end of the energy storage unit is coupled to a first end of the second secondary winding;
    wherein the second diode is a body diode of the metal-oxide semiconductor field effect transistor.

17. The power supply circuit of claim 2, further comprising a secondary-side diode having an anode coupled to a first end of the first secondary winding and a cathode coupled to a first end of the load, wherein a second end of the load is coupled to a second end of the first secondary winding.

18. The power supply circuit of claim 2, wherein a first end of the primary winding is coupled to a first end of the input power supply, a second end of the primary winding is coupled to a first end of the primary-side switch unit, and a second end of the primary-side switch unit is coupled to a second end of the input power supply, and
wherein a control end of the first switch is coupled to an output end of the first signal driving unit.

19. A UPS auxiliary power supply system, comprising:
an energy storage unit; and
the power supply circuit of claim 1, the power supply circuit coupled to a power supply, a load and the energy storage unit.

20. The UPS auxiliary power supply system of claim 19, further comprising:
a first signal sampling unit coupled to the primary winding to output a first signal reflecting a state of the input power supply;
a first signal driving unit coupled to the first switch and controlling the first switch to maintain in the off state or perform the on-off action according to the first signal; and
a second signal driving unit coupled to the second switch and controlling the second switch to maintain in the off state or perform the on-off action according to the first signal.

21. The UPS auxiliary power supply system of claim 20, wherein the secondary-side switch unit is a metal-oxide semiconductor field effect transistor having a gate coupled to an output end of the second signal driving unit, a drain coupled to a second end of the second secondary winding, and a source coupled to a second end of the energy storage unit,
wherein a first end of the energy storage unit is coupled to a first end of the second secondary winding;
wherein the second diode is a body diode of the metal-oxide semiconductor field effect transistor.

* * * * *